3,106,509
FUNGICIDES COMPRISING ORGANIC FERRIC
AMMONIUM ARSONATES
Masao Nagasawa, Shimizu City, Japan, assignor to Ihara Noyaku Kabushiki Kaisha, Shimizu City, Japan, a corporation of Japan
No Drawing. Filed Nov. 13, 1961, Ser. No. 152,010
Claims priority, application Japan Nov. 30, 1960
2 Claims. (Cl. 167—22)

This invention relates to fungicides in agriculture and horticulture comprising as active ingredients ferric ammonium salts of a compound having the general formula

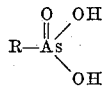

wherein R represents an alkyl group having 1 to 4 carbon atoms, which have high activity to noxious fungi with less phytotoxicity.

When using organo-arsenic compounds for protecting plants from infestations, it has been a great disadvantage that these compounds cause phytotoxicities such as brown spots (leaf burning) and non-fructification etc. in spite of the remarkable fungicidal activities.

This invention relates to ferric ammonium alkylarsonates obtained as the results of experiments to obviate the above mentioned disadvantages in the known organo-arsenic compounds, and is characterized in that the solubility in water of ferric ammonium alkylarsonates is increased considerably, thereby facilitating its use as fungicides, and also increasing its fungicidal activities, moreover minimizing the most important phytotoxicities such as non-fructification and brown spots if compared with those of conventional organo-arsenic compounds, thus providing safe and effective fungicides without the disadvantages of organo-arsenic compounds.

The compounds according to this invention can be produced by the following methods:

(1) To an aqueous solution of $RAsO_3Na_2$ is added an aqueous solution of ferric sulfate or ferric chloride to precipitate the ferric salt and the precipitates are added with ammonia water to dissolve them. The resulting solution is added with ethanol to precipitate ferric ammonium alkylarsonate and then they are filtered and dried.

(2) To an aqueous solution of $RAsO_3H_2$ is added an aqueous solution of ferric chloride and if the mixture is neutralized with ammonia, the ferric salt is once precipitated by concentration and the precipitates thus obtained are recrystallized. The purified precipitates are dissolved in ammonia to form ferric ammonium alkylarsonate, to which, if necessary, is added ethanol to precipitate the desired product which latter is filtered and dried.

Ferric ammonium alkylarsonates thus obtained contain arsenic and iron in the ratio of approximately 3:2 by mole ratio, but by adding further an iron compound it is possible to provide the complex of ferric ammonium alkylarsonate having more improved safety in phytotoxicity. The preferred iron compounds to be added are soluble organic or inorganic iron salts or iron complex salts, for example, ferric sulfate, ferric chloride, ferric citrate or ferric ammonium citrate etc. and the preferred amount to be added is within the range of from 1:1 to 1:5 in mole ratio of As:Fe by taking the iron in ferric ammonium alkylarsonate into account. In adding iron compounds, when the fungicide is spread without using water as a carrier, said iron compounds may be pulverized and admixed in that condition to the fungicide, but when using water it is necessary to add the iron compounds in such a form that it does not precipitate ferric hydroxide in water. For the reason, the iron salts must be previously converted to water soluble complex salts, since the iron salts generally form ferric hydroxide in a neutral aqueous solution. The process may be carried out as follows:

(1) Ferric ammonium alkylarsonate is added and mixed with ferric sulfate or ferric chloride and citric acid, and then when ammonia water is added thereto, the mixture is dissolved. In order to prepare the fungicide by adding a carrier, the solution may be used directly or the powders obtained by drying the product may be used. Furthermore, if ferric sulfate is used particularly a very small amount of citric acid is sufficient for the purpose.

(2) Ferric ammonium alkylarsonate is added and mixed with ferric citrate and when ammonia water is added thereto, the mixture is dissolved. The fungicide can be produced by the same method as in the case of (1).

(3) Ferric alkylarsonate is added and mixed with ferric sulfate or ferric chloride and citric acid and ammonia water is added thereto, then ferric ammonium alkylarsonate and water soluble ferric complex salt are produced at the same time to form a solution. In this case, the fungicide can be produced in the same manner as in the case of (1).

Organo-ferric ammonium arsonates or the substances added with iron compounds according to this invention may be used solely or by mixing with other compositions to prevent noxious microorganisms, more particularly fungi and it is most effective to apply the fungicide to the generating area of fungi, while it can be previously applied to the place where fungi might generate to prevent the growth of fungi. The compounds according to this invention are soluble in water and they may be used either solely or with addition of a carrier.

The "carrier" is to be understood to mean an agent for transferring the active components to the desired fungi or plants and it may be either of solid, liquid or gas. For example, solid carriers may be of various clays, talc, kaolin, diatomaceous earth, calcium hydroxide, calcium carbonate, vermiculite, sawdusts and tobacco powders etc. and liquid carriers may be of water, alcohol, petroleum, benzol and acetone etc. As gaseous carriers use may be made of air, nitrogen, and carbon dioxide gas etc. It is naturally preferable to improve and ensure the activity of the fungicide by mixing with an auxiliary agent commonly used in agriculture, for example, surface active agents, such as spreaders, emulsifiers, adhesives and the like, viz. non-ionic substances (polyoxyethylene alkylaryl ether, polyoxyethylene sorbitan monooleate etc.), anionic substances (alkylbenzene sulfonates, lignin sulfonate, higher alcohol sulfate and the like), cationic substances (alkyldimethylbenzylammonium chlorides, alkylpyridinium halides and the like) and amphoteric substances (betaine derivatives, dodecyldiaminoethyl glycine and the like).

The fungicides according to this invention may be used with addition of conventional insecticides, such as lead arsenate, nicotine, rotenone, trade name: BHC, DDT, Malathon, Parathion, EPN (ethyl-p-nitrophenylthionobenzenephosphonate), fungicides such as sulfur compounds, copper compounds and mercury compounds, plant growth regulant or fertilizers.

Examples of this invention will be explained in the following:

EXAMPLE 1

Ferric ammonium methylarsonate is diluted with water to be used as a dispersing solution having a given concentration. In this case, it is naturally desirable to use the above described wetting and spreading agents.

EXAMPLE 2

10% by weight of ferric methylarsonate is added and mixed with 30% by weight of ferric sulfate and 4% by weight of citric acid and the mixture is added with 40% by weight of ammonia water (28% $NH_3$) and 16% by weight of water to obtain a solution containing ferric ammonium methylarsonate and soluble ferric complex salt. The solution is diluted with water to provide a given concentration for spraying.

EXAMPLE 3

0.5% by weight of ferric ammonium butylarsonate and 99.5% by weight of the mixture of talc and clay are mixed and pulverized. The resulting powders are spread by a duster.

EXAMPLE 4

0.5% by weight of ferric ammonium ethylarsonate, 2% by weigth of ferric phosphate and 97.5% by weight by the mixture of talc and clay are mixed and pulverized and the resulting powders are spread by a duster.

EXAMPLE 5

10% by weight of ferric ammonium isopropylarsonate, 80% by weight of the mixture of diatomaceous earth and kaolin and 10% by weight of a wetting and spreading agent are mixed together and pulverized and the resulting powders are dispersed in water for spraying.

EXAMPLE 6

10% by weight of ferric ammonium methylarsonate, 15% by weight of ferric ammonium citrate, 65% by weight of the mixture of diatomaceous earth and clay and 10% by weight of wetting and spreading agent are mixed together and pulverized and the resulting powders are dispersed in water for spraying.

EXAMPLE 7

10% by weight of ferric ammonium methylarsonate, 10% by weight of a wetting and spreading agent, 20% by weight of alcohol and 60% by weight of water are mixed together and dissolved and the resulting solution is diluted with water for spraying.

EXAMPLE 8

10% by weight of ferric ammonium ethylarsonate, 85% by weight of excipients (starch, sodium bicarbonate, talc etc.), 2% by weight of gum arabic and 3% by weight of a wetting and spreading agent are mixed together and pulverized and the resulting powders are worked up into tablets. When using, the tablets are dissolved in water to be sprayed as a solution.

EXAMPLE 9

A concentrated solution, such as an adqueous solution, of ferric ammonium methylarsonate is adsorbed into roughly pulverized vermiculite up to about 2% by weight of concentration of the active component and they are mixed together and spread as grains.

The following experiments represent the results of activities of the compounds in the fungicide of this invention against organisms.

Test No. 1

RESULTS OF PREVENTING THE PHYTOTOXIC EFFECT

Each five rice-plants of Norin No. 17 (name of kind) per stump were planted in 1/20,000 area of Wagner's pots and 50 ml. of the solution of the active compounds were sprayed for the plants twice at the stage of young ears formation and the stage of fructification to test the leaf burning, non-fructification ratio after ripened fructification ratio and weight of one ear, and obtained the following results. The concentration of the solution was 200 p.p.m.

| Compounds | Non-fructification ratio (percent) | Fructification ratio (percent) | Weight ratio of one ear | Leaf burning |
|---|---|---|---|---|
| Methylarsonic acid | 87.4 | 12.6 | 15.1 | ++++ |
| Ferric methylarsonate | 21.5 | 78.5 | 100.5 | + |
| Ferric ammonium methylarsonate | 10.2 | 89.8 | 102.4 | − |
| Ferric ammonium methylarsonate plus twice amount of ferrous sulfate | 8.5 | 91.5 | 103.5 | − |
| Ethylarsonic acid | 86.2 | 13.8 | 16.5 | ++++ |
| Ferric ethylarsonate | 19.7 | 80.3 | 99.4 | + |
| Ferric ammonium ethylarsonate | 14.2 | 85.8 | 100 | − |

As apparent from the above results, ferric arsonic acid and ferric ammonium arsonate are less phytotoxic for both fructifications and leaves if compared with arsonic acid and particularly the mixture of ferric ammonium arsonate and twice amount of ferrous sulfate has splendid activity.

Test No. 2

ACTIVITY TEST (A)

The results of tests for preventing *Corticium sasaki-shirai*, Matsumoto, were as follows:

Rice-plants of Norin No. 17 were cultivated on 1/20,000 area of Wagner's pots in a greenhouse and 50 ml. of the solution of the active compounds were sprayed on the plants just before heading. After one week of the spraying, the plants were inoculated with hyphae of *Corticium sasaki-shirai*, Matsumoto, which had been previously cultured on a potato agar plate. One week after after the inoculation, the percentage of the infected stems was determined. The concentration of the active compound was 100 p.p.m.

Compounds:                  Infected stem (percent)
    Ferric ammonium methylarsonate _____ 15.8
    Ferric ammonium ethylarsonate _____ 18.2
    Ferric ammonium isopropylarsonate_____ 21.4
    Ferric ammonium butylarsonate _____ 24.9
    Urbacid (arsenic compound made by Beyer & Co.) _____ 32.1
    Untreated _____ 96.3

Test No. 3

ACTIVITY TEST (B)

I. *Effect of preventing the infection of fungi.*—Ripened Delaware grape clusters, while rotating, were sprayed with the active compounds by means of a spray gun. After 24 hours of the spraying, the clusters were sprayed and inoculated with *Glomerella cingulata* spore floating solution (140 per view) and maintained in a humid room at 28° C. for ten days to check the rate of the infect. The concentration of the active compounds were 100 p.p.m.

Compounds:                  Infected cluster (percent)
    Ferric ammonium methylarsonate _____ 7.7
    Ferric ammonium ethylarsonate _____ 9.6
    Ferric ammonium isopropylarsonate _____ 12.5
    Ferric ammonium butylarsonate _____ 13.1
    Urbacid _____ 15.2
    Untreated _____ 96.3

II. *Field test.*—20 of 18 year old Delaware grape plants per 10 area were taken as one test group and they were sprayed 3 times with the solutions of the active compounds on June 25, July 15 and August 4 and the clusters infected by *Glomerella cingulata* were checked on August 15. The concentration of the active compounds were 100 p.p.m.

| Compounds | Replication | Number of investigated cluster | Infected cluster (percent) |
|---|---|---|---|
| Ferric ammonium methylarsonate | 1 | 589 | 3.5 |
|  | 2 | 732 | 6.6 |
|  | 3 | 682 | 0.9 |
|  | average |  | 3.67 |
| Ferric ammonium ethylarsonate | 1 | 562 | 4.5 |
|  | 2 | 813 | 6.2 |
|  | 3 | 624 | 4.3 |
|  | average |  | 5.0 |
| Ferric ammonium butylarsonate | 1 | 638 | 8.6 |
|  | 2 | 629 | 4.5 |
|  | 3 | 853 | 8.2 |
|  | average |  | 7.1 |
| Bordeaux mixture | 1 | 899 | 11.9 |
|  | 2 | 746 | 12.5 |
|  | 3 | 796 | 8.3 |
|  | average |  | 10.9 |
| Untreated | 1 | 825 | 32.5 |
|  | 2 | 709 | 33.6 |
|  | 3 | 551 | 21.9 |
|  | average |  | 29.3 |

What I claim is:

1. Fungicides for agricultural and horticultural purposes which comprise:
   water soluble ferric ammonium salts of compounds having the formula

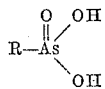

wherein R represents an alkyl group having 1 to 4 carbon atoms, and
   an inert carrier for said water soluble ferric ammonium alkyl arsonates.

2. Fungicides according to claim 1 comprising in addition an iron compound selected from the group consisting of ferric sulfate, ferric chloride, ferric citrate and ferric ammonium citrate whereby the phytotoxic activity of said fungicide is minimized.

References Cited in the file of this patent
UNITED STATES PATENTS
2,346,155    Denison et al. _____ Apr. 11, 1944